Nov. 18, 1941. W. L. GORDEN ET AL 2,262,890
ENGINE GOVERNOR
Filed April 1, 1939 8 Sheets-Sheet 5
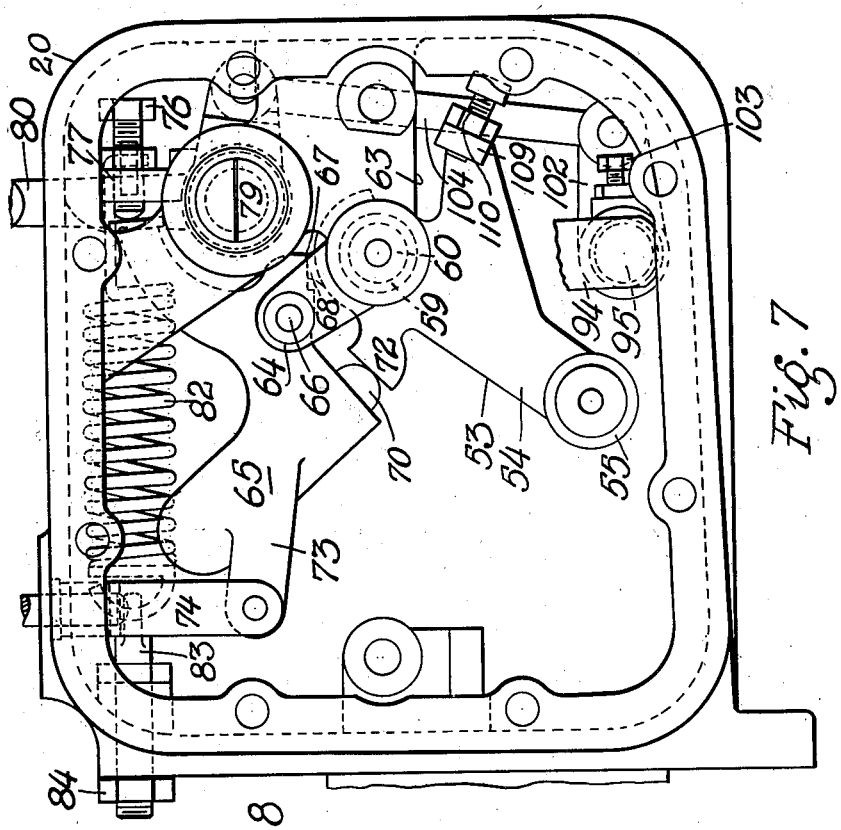
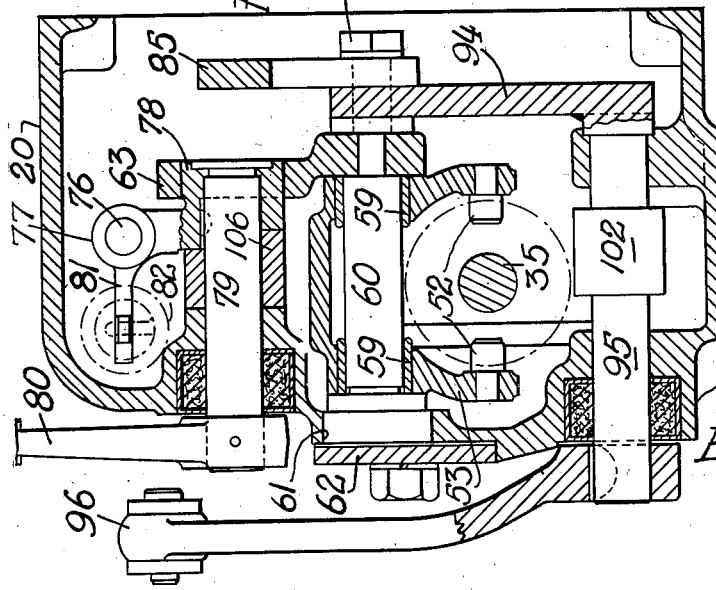
Inventors
W. L. Gorden
P. P. Polko
By Paul O. Pippel
Atty.

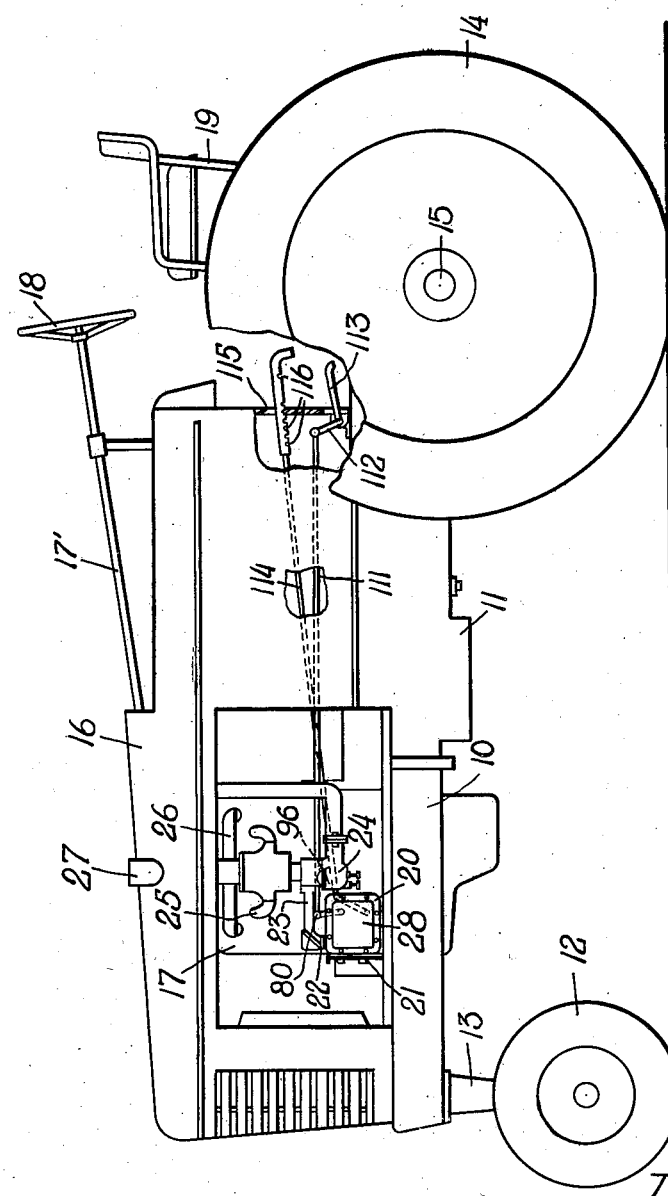

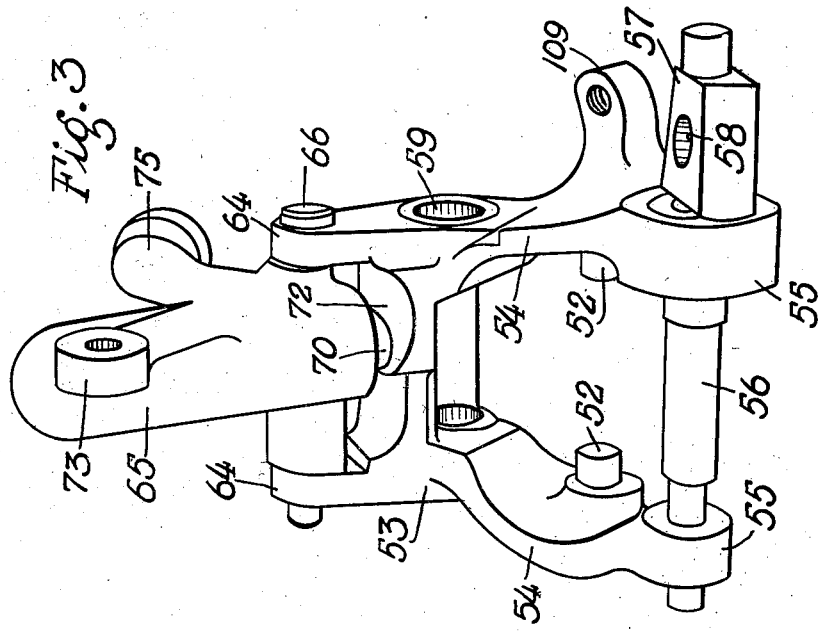
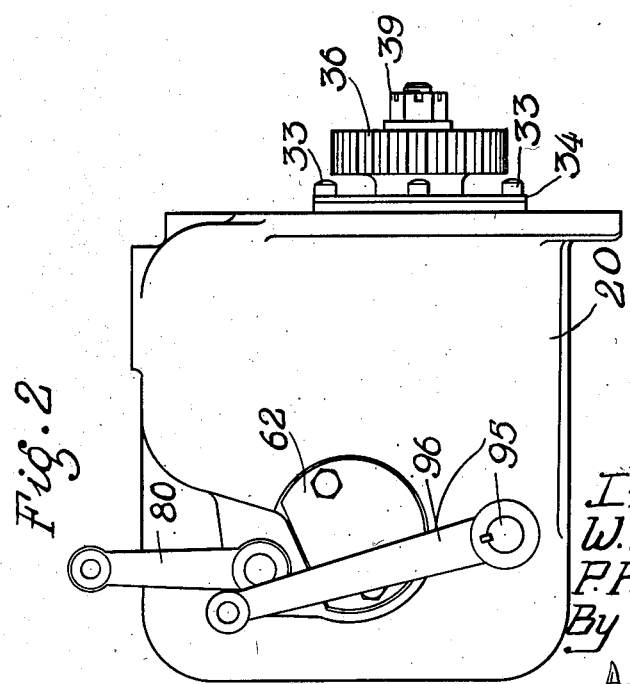

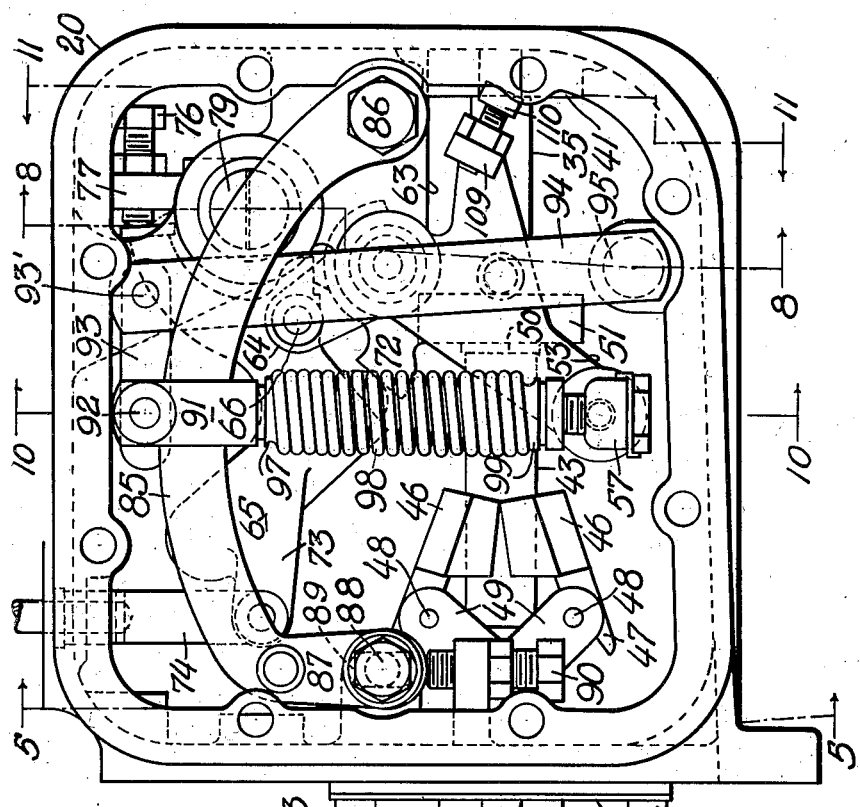
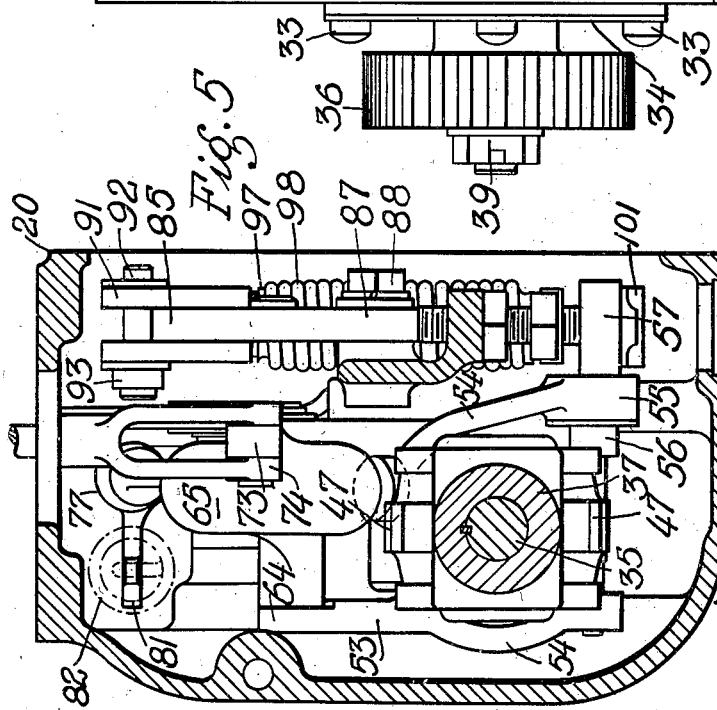

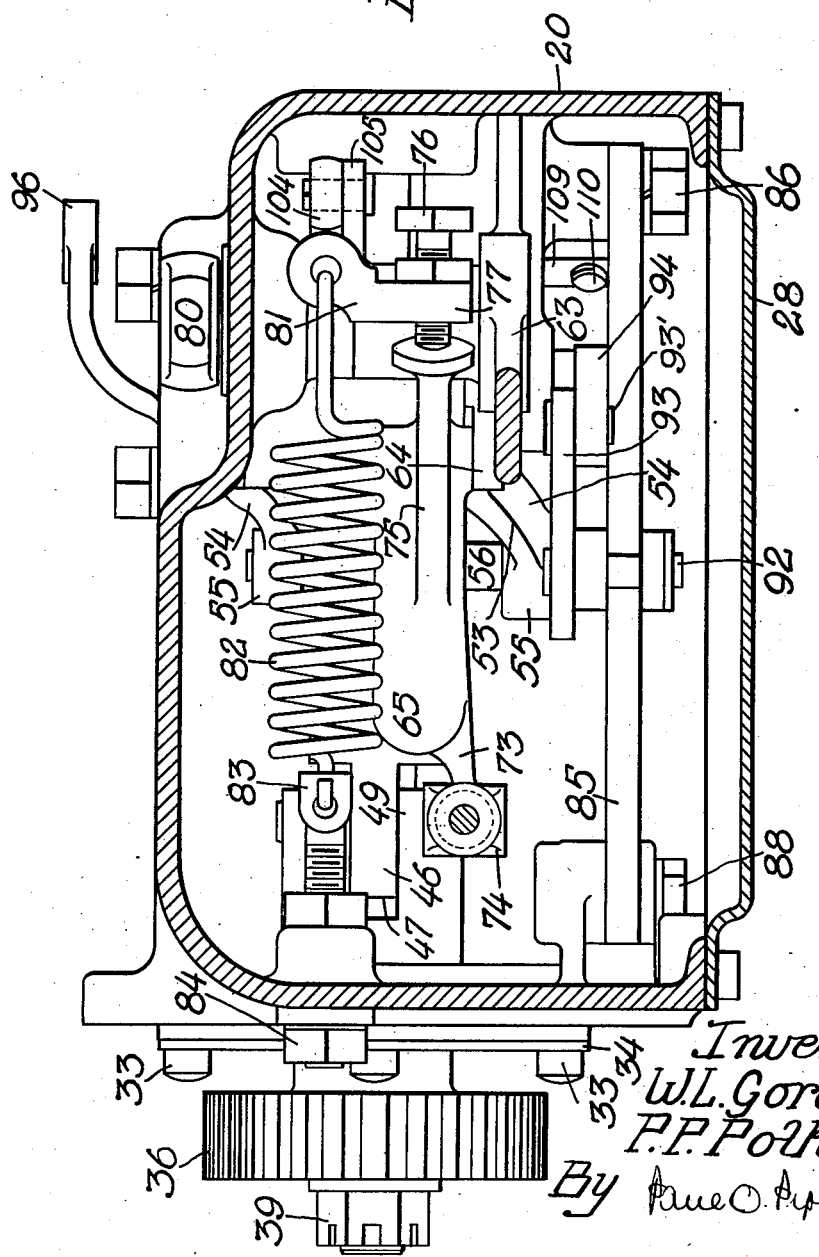

Nov. 18, 1941.  W. L. GORDEN ET AL  2,262,890
ENGINE GOVERNOR
Filed April 1, 1939  8 Sheets-Sheet 6

Inventors
W.L.Gorden
P.P.Polko
By Paul O. Pippel
Atty.

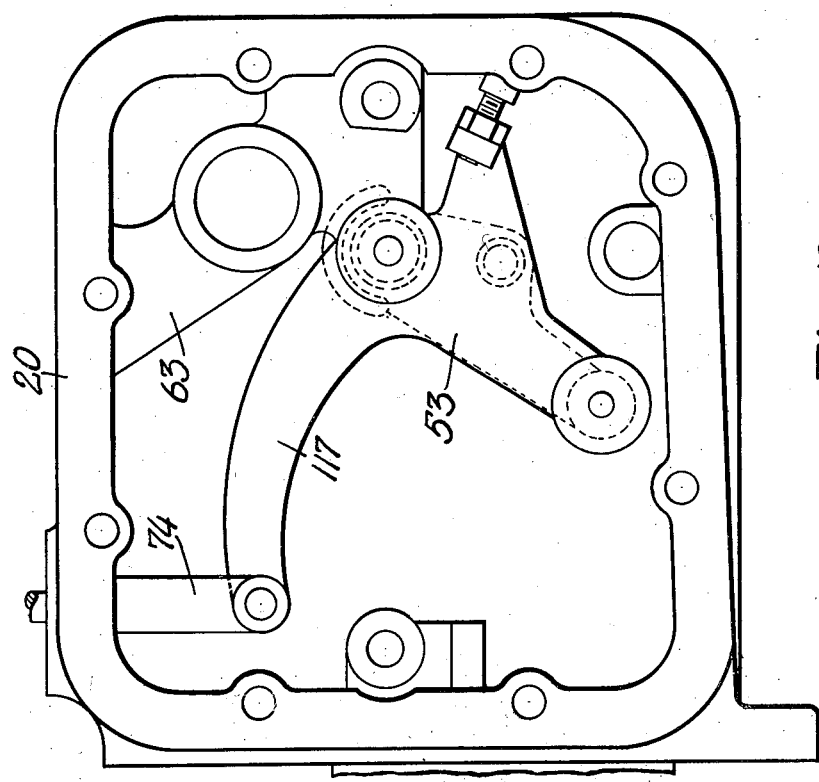
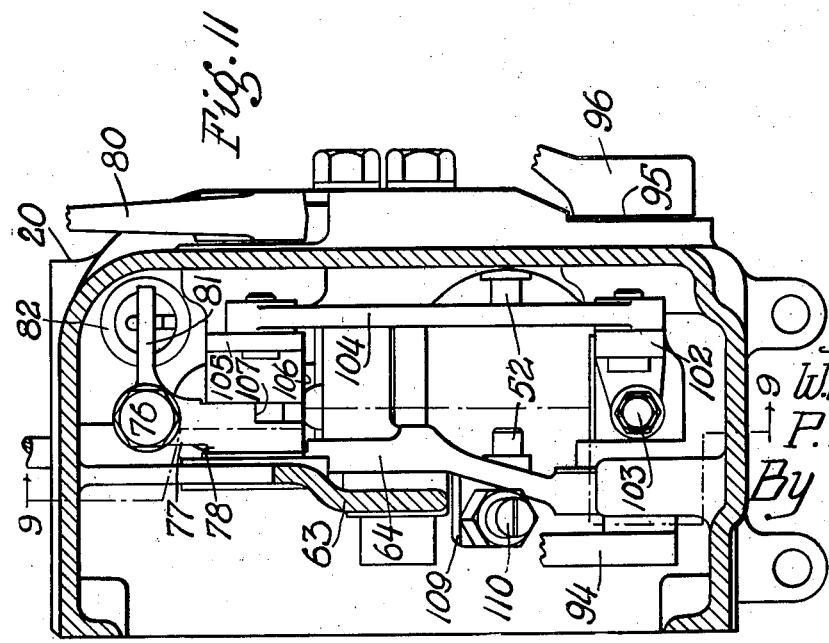

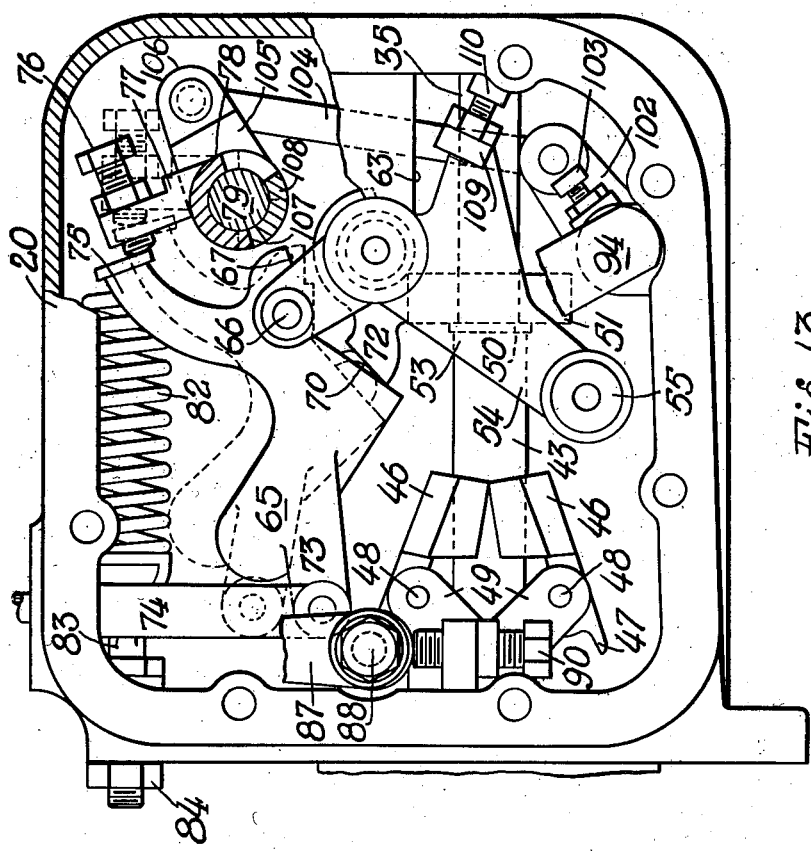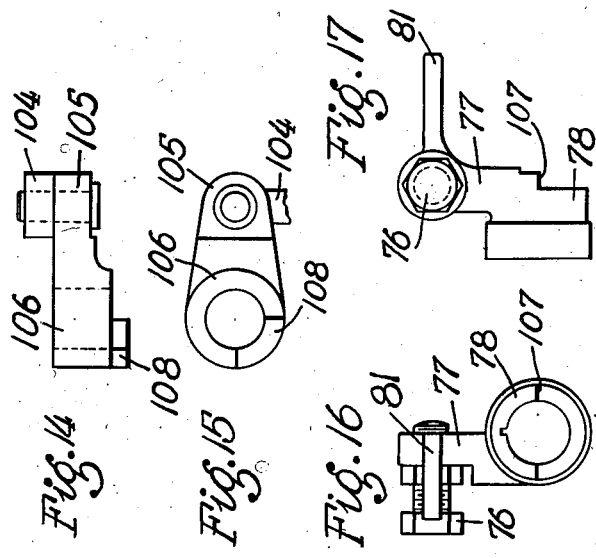

Patented Nov. 18, 1941

2,262,890

UNITED STATES PATENT OFFICE 2,262,890

ENGINE GOVERNOR

Walter L. Gorden, La Grange, and Peter P. Polko, Lyons, Ill., assignors to International Harvester Company, a corporation of New Jersey Application April 1, 1939, Serial No. 265,552

20 Claims. (Cl. 123—98)

This invention relates to an engine governor. More particularly it relates to a governor particularly adapted for use on a tractor and to mechanism permitting manual governing of the engine speed in addition to an adjustable mechanical governor.

The principal object of the invention is to provide an improved governor mechanism for engines which, in addition to an adjustable mechanical governing range, is provided with means for permitting manual speed control with the governor mechanism determining a maximum speed.

Another object is to provide improved means for adjusting the setting of the governor for different speeds.

Another object is to provide an adjustable stop mechanism to prevent manual control throughout the normal range of mechanical control.

The above objects and other more detailed objects, which will be apparent from the description to follow, are accomplished by providing a centrifugal weight governor device with hinged actuation members resiliently held in one position during mechanical governing and provided with means for moving the two members relative to each other for manual speed control. Stop means are also provided interconnected to the speed control means to prevent manual actuation during the normal mechanically governed speeds. This is significant in the operation of a tractor for field work or for other heavy duty work where it is desirable to maintain a fixed speed substantially below the maximum possible speed at which the engine will operate in order to increase the life of the engine and the associated parts. For other conditions, such as road work on pneumatic tires or where light loads are being pulled, it is desirable to have a manual control means, by which the engine can be operated from idle position up to the maximum speed at which the engine can be operated satisfactorily with light loads.

In the drawings:

Figure 1 is a side elevation of a tractor, on the engine of which a governor incorporating the invention is mounted, a section of the dash portion of the tractor being broken away in section to show the controls for the governor;

Figure 2 is an elevation of the engine side of the governor, showing the control levers and the driving gear;

Figure 3 is a perspective view of the main governor member and the actuating member which is pivoted thereon for relative angular movement with respect thereto;

Figure 4 is a side elevation of the governor construction with the cover plate removed;

Figure 5 is a section taken on the line 5—5 of Figure 4;

Figure 6 is a top view of the governor construction with the upper wall broken away in section;

Figure 7 is a side elevation similar to Figure 4 with the cam track and the rotating governor parts omitted, better to show the mechanism which lies back of certain of the elements adjacent the cover;

Figure 8 is a section taken on the line 8—8 of Figure 4;

Figure 11 is a section taken on the line 11—11 of Figure 4;

Figure 12 is a side elevation similar to Figure 4, showing a modified supporting and actuating member;

Figure 13 is a side elevation similar to Figure 4 with the cam track and associated parts removed and with a portion of the upper right hand corner broken away on the section 13—13 of Figure 10;

Figure 14 is a plan view of one of the stop members;

Figure 15 is an elevation of the member shown in Figure 14;

Figure 16 is an end view of the manually operated member which carries a second stop means; and, Figure 17 is an elevation of the member shown in Figure 16.

Figures 9, 10:
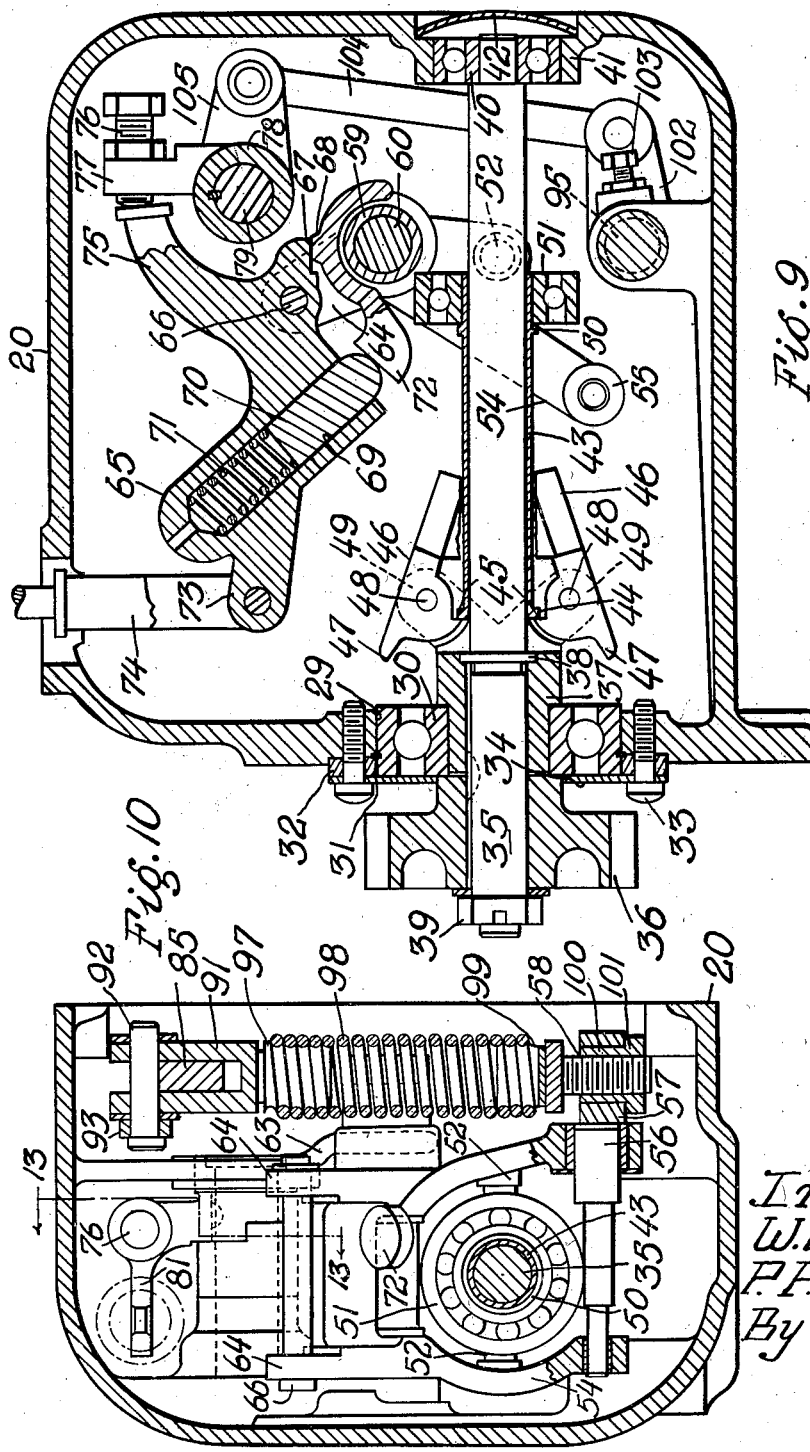
Figure 9 is a section taken substantially on the line 9—9 of Figure 11.
Figure 10 is a section taken substantially on the line 10—10 of Figure 4.

In the following description, it should be kept in mind that the governor construction illustrated is in three dimensions with several of the parts lying behind or under other of the parts. The drawings have been made to illustrate as clearly as possible the construction by eliminating certain of the parts in the background in certain of the views. For that reason, some of the sections cannot be said to be completely taken on the section lines indicated. The description, however, refers to the figures which best show the parts being described and show the interrelation by referring to different figures.

In Figure 1 of the drawings, a complete tractor is shown in outline in order to illustrate how the governor and the controls therefor are applied to an engine in actual construction. The tractor illustrated is of the tricycle type having a narrow front frame 10, a rear frame structure 11, front wheels 12 mounted on a steerable standard 13, and rear wheels 14 mounted on rear axles 15. A superstructure 16 mounted on the frame substantially encloses the engine 17 and the other component parts of the power plant. A steering shaft 17' extends rearwardly above the superstructure 16, being provided with a steering wheel 18 located adjacent the operator's station. A seat 19 is located at the rear of the tractor. The usual controls for the tractor are not shown, as it is desirable to eliminate such parts in order better to show the governor controls which form a part of the present invention.

The governor mechanism is contained in a casing 20 rigidly secured to an extension housing 21 of the engine which contains driving gears for the governor. An upwardly extending housing 22 at the upper forward portion of the casing 20 is connected with a tubular housing 23 which extends to the top portion of a carbureter 24. These housings contain the usual connections between the governor and the throttle of the carbureter. The carbureter is shown as being secured to an intake manifold 25 mounted on the engine. An exhaust manifold 26 is shown in outline, said manifold connecting with an exhaust pipe 27 extending upwardly above the tractor.

The governor casing 20 is substantially rectangular in cross section in all three of its dimensions. The outer side is open, having a faced portion to which a cover plate 28 is secured, as shown in Figures 1 and 6, to enclose the casing and prevent any dust reaching the governor mechanism.

Referring to Figure 9, the casing 20 is provided at its forward end adjacent the housing 21 with a large opening 29 in which a ball bearing assembly 30 is mounted. Said assembly is of the type constructed to take axial thrust in either direction. The outer race of the assembly is provided with a snap ring 31, which serves the purpose of holding the outer race rigidly in position with respect to the casing 10, being clamped in position by an annular member 32 and a plurality of cap screws 33. A cover plate 34 is also held in position by the cap screws 33, said cover plate extending radially inwardly adjacent the inner race of the assembly to provide sealing means therefor.

A shaft 35 extends through the ball bearing assembly 30, carrying, keyed thereto, a gear 36 positioned forwardly of the casing and a shouldered member 37. The shouldered portion of said member abuts the inner side of the inner race of the bearing assembly and the hub of the gear 36 abuts the outer side of said inner race. An annular collar 38 on the shaft 35 within the casing provides abutment against which the member 37 is seated. A nut 39 rigidly clamps the member 37 and the gear 36 in position against the collar 38. The shaft 35 and the elements keyed thereon are, by this construction, held rigidly in position with respect to the ball bearing assembly 30 to resist axial motion in either direction.

The end of the shaft 35 opposite the gear 36 is provided with a reduced end portion fitted into the inner race of a ball bearing assembly 40. Said assembly is carried in a bore formed in an inwardly projecting boss 41 formed as a part of the rear end wall of the casing 20. A Welch plug 42 closes the opening in the end wall of the casing.

A sleeve 43 is rotatably and slidably fitted over the portion of the shaft 35 within the casing 20. At the forward end of the sleeve, an annular flange 44 is formed to provide an abutment for engaging lugs 45 on pivoted governor weights 46. Said weights are shaped with arcuate portions fitting around the sleeve 43 when the weights are in closed position. It will be understood that the amount of material in the weights and the location of the weight relative to the pivot points is carefully worked out to cooperate with the other forces present in the governor to give the desired action throughout the required range of speed. Stop portions 47 are provided on the governor weights to limit the outward swinging movement thereof.

The governor weights 46 are mounted on pivot pins 48 extending at right angles to the shaft 35 and spaced outwardly therefrom. Said pins extend through alined apertures formed in transversely spaced ears 49 formed integrally with the member 37. It will be understood that in operation of the governor, the weights 46 swing outwardly, the forces depending upon the speed of rotation of the shaft 35 with the engaging portions 45 acting on the sleeve 43 to exert pressure on said sleeve in a rearward direction. The gear 36 is connected to gearing, not shown, in the housing 21 driven directly from the engine at a predetermined speed ratio with respect to the rotation of the crank shaft.

At its rear end, the sleeve 43 is provided with an annular collar 50 spaced a short distance from the end thereof to provide for mounting a ball bearing assembly 51 at that end of the sleeve. The inner race of the assembly fits over the sleeve, abutting as a stop a collar 50. The outer race of the assembly abuts transverse alined trunnions 52 carried on the main governor member 53. The abutment against the pins is shown in dotted lines in Figures 4 and 9. The perspective view of Figure 3 best shows the governor member 53. This view has been shown, as, due to the three dimensional characteristics of many of the governor parts, a perspective view is almost necessary to make clear the actual construction of the governor mechanism.

The member 53 is provided with downwardly and forwardly projecting portions 54, which are spaced apart to clear the ball bearing assembly 51 during operation of the governor weights to move the assembly in a fore and aft direction. The portions 54 carry the trunnions 52. Said portions also project beyond the trunnions and are provided with alined bores 55 to support a transversely pivoted member 56. It will be noted that the outer bore 55 is considerably larger and that the bearing provided on the member 56 at that time is considerably larger than at the inner end. This is merely a mechanical provision required to carry a much greater load at the outer end, as the load on said member is transmitted to an outer, overhanging end portion 57 of the member, which is flattened and provided with a bore 58 through the flattened portion, for a purpose to be hereinafter described.

The member 53 is provided with transverse bores containing bearing sleeves 59 to provide means for mounting the member on a transverse shaft 60, best shown in Figure 8. Said shaft is supported at the inner end, being provided with an enlarged portion fitted in a bore 61 formed in the inner wall of the casing 20. A plate 62 is secured to the casing by cap screws, as best shown in Figures 2 and 8, to secure the shaft in position. At its outer end, the shaft 60 is provided with a reduced end portion supported in a web 63 of the casing 20.

As shown in Figures 3, 4, 7 and 9, the member 53 is provided with two laterally spaced upward extensions 64 on which a member 65 is pivoted for oscillation on a transverse axis on a pivot pin 66.

The member 65 is formed with a stop portion 67, as best shown in Figures 7 and 9, which abuts a stop 68 provided on the member 53. This stop means limits pivotal movement of the member 65 with respect to the member 53 in a clockwise direction, viewing the construction from the open face of the casing. The member 65 is provided with a bore 69 in which a plunger 70 is mounted, being urged outwardly in a downward direction by a compression spring 71. The plunger 70 is positioned to engage a stop 72 formed on a portion of the member 53. It will be understood that this plunger, due to the spring action thereagainst, urges the member 65 in a clockwise direction and normally maintains the stop portion 67 in contact with the stop 68. In the anticlockwise direction, the member 65 may be moved with respect to the member 53 by overcoming an action of the spring 71 until the adjacent portions of the two members are brought into abutting position. By inspection of Figure 9, it will be noted that this action is limited to approximately 15 degrees.

The member 65 is provided with an integral forwardly extending lever arm 73, which is pivotally connected to a throttle control rod 74. This rod extends upwardly into the housing 23, where it is connected with throttle controlling means. Said means is so constructed that the throttle may be moved from idle to wide open position by a predetermined vertical movement of the rod 74.

Referring to Figures 3 and 9, the member 65 is provided with an upwardly and rearwardly extending arm 75. Said arm is formed with a face portion adapted to be engaged by an adjustable cap screw 76 threaded into a lever arm 77 carried by a sleeve 78, best shown in Figures 16 and 17. Said sleeve is keyed to the inner end of a shaft 79, as best shown in Figures 8 and 9. Said sleeve is supported in the web 63 of the casing at its inner end and extends outwardly through the wall of the casing, being rotatably supported therein. Beyond the inner wall of the casing, an actuating arm 80 is secured to the shaft 79. It will be understood that pressure may be exerted against the arm 75 of the member 65 by angular movement of the actuating lever 80.

An extension 81 is carried by the lever arm 77 to provide an attaching point for a tension spring 82. Said spring, as best shown in Figures 6 and 7, extends longitudinally in the casing in the upper portion thereof, being connected at its forward end to an apertured member 83. Said member extends through a bore in the casing and is provided with an end portion, on which a nut 84 is threaded. This construction provides for adjusting tension on the spring 82. The cap screw 76 provides a means for adjusting the relation between arm 75 and lever 77, it being so adjusted that it just clears arm 75 when lever 77 is vertical and governor is operating normally.

An arcuate cam track 85 is mounted in the casing with the rear end being secured by a cap screw 86 to an extension of the casing adjacent the end wall. The forward end of the cam track 85 is provided with a downwardly extending portion 87 which is secured by a cap screw 88 to an extended portion at the front wall of the casing. A slot 89 is provided through which the cap screw 88 extends, whereby the front end of the track may be adjusted vertically by means of a cap screw 90 extending through an integral location at the front wall of the casing.

As best shown in Figure 10, a yoke member 91 has spaced side portions slidably engaging the sides of the track 85. A transverse pin 92 extends through alined openings in the side portions of the member 91 above the track 85. An actuating link 93 is also pivotally carried on the pin 92. Said actuating member, as best shown in Figure 4, is pivotally connected on a transverse axis by a pivot pin 93' with the upper end of a lever 94. Said lever, as best shown in Figure 8, is rigidly connected at its lower end to a transverse shaft 95. Said shaft extends outwardly through a bearing bore formed in the casing 20, where it is keyed to an outside actuating lever arm 96.

The member 91, as shown in Figure 10, is provided with a downward cylindrical extension 97 formed with a plurality of large threads shaped to engage the convolutions of a spring 98. The lower end of said spring is similarly threaded to the cylindrical end portion of a member 99. Said member has a threaded end portion of reduced diameter on which a sleeve 100 is adjustably mounted. Said sleeve extends through the opening 58 in the member 56, previously described. A flange 101 on the sleeve 100 abuts the lower face of the flattened portion 57 transmitting the tension of the spring to the member 56. Said spring acts to urge the member 53 in a clockwise direction, thereby bringing the trunnions 52 to bear against the assembly 51 to overcome the centrifugal action of the governor weights 46. The tension of the spring 98 may be regulated by adjusting the threaded sleeve 100. The rate of the spring may be adjusted by threading the spring on the cylindrical portions 91 and 99. As the rate of a spring is a very important factor in governor operation, the above described construction, by which the rate of the spring may be varied, is a very important factor and is a significant feature of the present invention.

A lever arm 102 is rigidly secured by a set screw 103 on the shaft 95. Said lever arm is connected by a link 104 to a lever arm 105 carried by a member 106, best shown in Figures 14 and 15, which is freely rotatable on the shaft 79 between the sleeve 78 and the inner wall of the casing. The relation of the member 106 to the other parts is best shown in Figures 8 and 10.

As best shown in Figures 16 and 17, the sleeve 78 is provided with a stop portion 107. Said stop portion is formed by cutting away the sleeve on a diameter whereby the upper half portion of the sleeve extends laterally in the direction of the shaft 79 farther than the lower stop portion of the sleeve. When the governor is in its mechanical governing position, the diameter forming the stop portion lies substantially horizontal, as shown by dotted lines in Figure 13, and by full lines in Figure 10. The member 106 is formed with a stop 108 extending laterally in the direction of the sleeve 78. The stop 108 is in the form of a quarter of an annulus, the three-quarter portion being cut away to form the projecting stop. The stop 108 in the normal mechanical governing position lies with the upper portion of the stop substantially horizontal, as shown in Figure 10, and with the lower portion of the stop substantially vertical, as shown in dotted lines in Figure 13. The position of the lever arm 105 in Figure 9, compared to the detailed view of Figure 15, will show the relative position of the stop 108.

The member 53 at the open side of the casing is provided with an extension 109 into which a cap screw 110 is threaded to provide for swinging lever 53 in a counterclockwise direction when lever 94 is moved to its extreme rearward position. In effect, this adjustment forms an adjustable idling position for the engine.

The actuating levers 96 and 80, as shown in Figures 2 and 8, are connected to controls adjacent the operator's station, as shown in Figure 1. A link 111, pivotally connected to the actuating lever 80, is pivotally connected to a lever arm 112 pivoted to a portion of the tractor frame structure. An accelerator pedal 113 is connected to the lever arm 112, whereby an operator, by depressing the pedal 113, moves the actuating lever 80 rearwardly in a clockwise direction when referring to Figure 1. An operating link 114 is connected to the lever 96 and extends through a wall 115 in the superstructure of the tractor. A plurality of notches 116 is provided to adjustably hold the link 114 in a plurality of positions.

For some constructions where it is not necessary that manual means be provided, such as an accelerator for operating over a wide range, the member 65 may be eliminated. Such a construction is shown in Figure 12, insofar as the construction is different. In this construction, the member 53 carries an integral lever arm 117, which is adapted to connect directly with the throttle operating rod 74. In this construction, the lever arm 80, the shaft 79, the arm 77, and the spring 82, together with the associated parts are not fitted in the casing.

In the operation of the governor, as above described, the shaft 35 is rotated by the gear 36 from gears connected to the crank shaft of the engine. The weights 46 tend to swing outwardly exerting a force depending upon the speed of rotation against the sleeve 43 and through the ball bearing assembly 51 against the trunnions 52 on the member 53. Through said member, force is transmitted through the member 65 to the throttle control rod 74. It is to be understood that the spring 71 is of a strength sufficient to maintain the stop 67 against the stop 68 during the mechanical governing action, whereby the members 53 and 65 rotate on the shaft 60 as a unit. It will be understood that the lever arm 77 is in a substantially vertical position, as shown in Figures 7 and 9, whereby action of the governor is not influenced in any way. When the stop on the arm 75 is against the set screw 76, wide open position of the throttle is indicated. As the governor weights swing out to reduce the speed, the lever arm 75 moves away from the stop formed by the adjusting screw 76.

The cam track, as shown in Figure 4, forms a support for the tension spring 98. As the yoke member 91 is connected to the lever 94, it is moved along the track to adjust the tension of the spring 98 by its effective lever arm to shaft 60 through the torque on lever 53 about shaft 60 upon actuation of the lever arm 96. The position of the spring 98, as shown in all of the figures of the drawings except Figure 13, represents a speed of approximately 1400 R. P. M., which is about the maximum at which tractor engines are operated at the present time. The lever arm may be moved to reduce the speed of the engine by moving the top of the spring to the right end of the track, referring to Figure 4, to reduce the speed to 1,000 R. P. M. or less. It may be also moved to bring the speed entirely down to idle position, which would be at the extreme right.

When it is desired to operate the tractor with manual throttle control with the foot accelerator 113, the throttle adjusting operating link 114 is moved to its extreme position, thereby moving the lever arm 96 to the extreme forward position. This position represents maximum speed of the engine at which the governor will become operative. Within the speeds between idle and this extreme position, the foot accelerator may be utilized, as will now be described.

Referring now to Figure 13, when the lever 94 is moved to the forward position, as shown by the lower end portion, the link 104 moves the member 105 in an anti-clockwise direction, thereby moving the stop 108 downwardly and away from the stop portion 107 on the sleeve 77. This permits the arm 77 to swing forwardly in an anti-clockwise direction, being pulled in that direction by the spring 82. As said spring is much stronger than the compression spring 71, which holds the member 65 against the stop 68, said member is moved away from the stop, the plunger 70 being compressed and the throttle being closed down to idle position. It will be understood that, when the hand control member 106 is shifted to the maximum speed range, the stop 108 is removed, thereby allowing the spring 82 to close the throttle to idling position.

The foot accelerator is operative when the speed control is set, as shown in Figure 13, being responsive to move the lever 77 in a clockwise direction, thereby permitting the spring 71 to open the throttle in direct proportion to the movement of the accelerator pedal. This construction gives a free accelerator action up to the maximum speed as determined by the setting of the lever 96. When the speed reaches the predetermined point, as determined by the construction of the parts and the strength of the spring 98, the governor acts to pick up the member 65 by means of a stop 68 abutting the stop 67, thereby acting to close the throttle regardless of the position of the accelerator pedal. This is the significant feature of the present invention, namely, that a wide range of governor adjustment may be utilized with the foot accelerator being held entirely inoperative. These speeds correspond to the normal working speeds of the tractor during heavy duty operation in the fields or when pulling other loads at near maximum power for considerable periods of time.

The construction, however, provides for high speed operation of the tractor with light loads without governor operation by merely shifting the governor into a maximum speed position. This removes the stop means from the accelerator control and causes the spring 82 to close the throttle. Operation is then manual by foot accelerator means from idle up to the maximum speed determined by the governor setting. This is a particularly important feature, as tractors are now provided with pneumatic tires and are operated on roads with light loads where high speeds are required. The tractor is operated under these conditions exactly as an automobile with the conventional accelerator.

It is to be understood that applicants have shown and described only a preferred embodiment of their combined mechanical governor and manual speed control with a maximum speed control, and that they claim as their invention such a device illustrated and falling within the scope of the appended claims.

What is claimed is:

1. In a variable speed governor for internal combustion engines, having a movable governor member, means consisting of centrifugal devices for urging the member in one direction and spring means for urging the member in the return direction, and in combination therewith, a throttle control member connected to the governor member and normally movable therewith, means for adjusting the spring means to regulate the speed setting of the governor, means for returning the throttle control member to idle speed position when the spring means is adjusted to set the governor in its maximum speed position, means operable by said adjusting means to render the governor device inoperative at speeds between slow idle speed and said maximum attainable speed, and manually operable means for moving the control member relative to the governor.

2. In a variable speed governor for internal combustion engines, having a movable governor member, means consisting of centrifugal devices for urging the member in one direction and spring means for urging the member in the return direction, and in combination therewith, a throttle control member connected to the governor member and normally movable therewith, means for returning the throttle control member to idle speed position when the governor member is advanced to its maximum speed position, and manually operable means for moving the control member relative to the governor, said means being connected to the throttle moving means with releasable holding means whereby the manually operable means are operable only during idle speed position of the throttle control member and maximum speed position of the governor member.

3. In a variable speed governor for internal combustion engines, having a governor member, means consisting of a centrifugal governor for urging the member in one angular direction and spring means for urging the member in the other direction, and in combination therewith, a throttle control member pivotally connected to the governor member and resiliently held thereagainst for movement therewith, means for adjusting the spring means to regulate the speed setting of the governor, and means operable by said adjusting means to return the throttle control member to idle speed position upon advancement of the spring means to maximum speed position, said adjusting means when moved to said maximum speed position simultaneously rendering the governor inoperative at speeds between slow idle and said maximum attainable speed.

4. In a variable speed governor for internal combustion engines having a governor member, means consisting of centrifugal devices for urging the member in one angular direction and spring means for urging the member in the other direction, and, in combination therewith, a throttle control member pivotally connected to the governor member and resiliently held thereagainst for movement therewith, means for adjusting the spring means to regulate the speed setting of the governor, means operable to resiliently return the throttle control member to idle speed position upon advancement of the spring means to a maximum speed position, and manual means thereafter operable for returning the control member to maximum speed position as determined by the position of the governor member.

5. A variable speed governor device for engines comprising centrifugal governor means, adjusting means connected to said centrifugal means for selecting a predetermined speed over a substantial range of manually selectable speeds, accelerator means for manually controlling the throttle of the engine, means operative to render said accelerator means inoperative throughout the governor speed range, and throwout means operative to render the accelerator means operative when the governor is shifted to its extreme maximum speed position.

6. A variable speed governor device for engines comprising centrifugal governor means, adjusting means connected to said centrifugal means for selecting a predetermined speed over a substantial range of manually selectable speeds, accelerator means for manually controlling the throttle of the engine, means operative to render said accelerator means inoperative throughout the governor speed range, and means for returning the throttle to idle speed position when the adjusting means is advanced to a maximum speed position.

7. A variable speed governor device for engines comprising centrifugal governor means, adjusting means connected to said centrifugal means for selecting a predetermined speed over a substantial range of manually selectable speeds, accelerator means for manually controlling the throttle of the engine, means operative to render said accelerator means inoperative throughout the governor speed range, and means for returning the throttle to idle speed position when the adjusting means is advanced to a maximum speed position, said means being operative to render the accelerator means operative.

8. In a tractor having an engine, a throttle for controlling the fuel supply of the engine, and an automatic governor control dependent on the rotation of the engine for maintaining a predetermined speed under varying load conditions, the combination of control means connected to said automatic control manually operable to select a predetermined speed, independent means manually operable to regulate the speed of the engine, said means being inoperative during operation of the governor control, and means actuated by the governor control for limiting the maximum speed of the engine during operation of the manual speed regulation means.

9. In a tractor having an engine, a throttle for controlling the fuel supply of the engine, and an automatic governor control dependent on the rotation of the engine for maintaining a predetermined speed under varying load conditions, the combination of control means connected to said automatic control manually operable to select a predetermined speed, manually operable independent means for altering the speed of the engine, locking means effective to hold said means against actuation during operation of the governor control, and means actuated by advancement of the control means to a predetermined speed to release said locking means.

10. In a tractor having an engine, a throttle controlling the fuel supply of the engine, and an automatic governor control dependent on the rotation of the engine for maintaining a predetermined speed under varying load conditions, the combination of control means connected to said automatic control manually operable to select a predetermined speed, manually operable independent means for altering the speed of the engine, locking means effective to hold said means against actuation during operation of the governor control, and means actuated by advancement of the control means to a predetermined speed to release said locking means and to return the governor to idle speed position.

11. A governor device for engines comprising a centrifugal governor, adjusting means connected to said governor for selecting one of a range of predetermined speeds, manually operable accelerator means for controlling the throttle of the engine, means interconnecting the governor and the accelerator means for locking said accelerator means in inoperative position during operation in the governor speed range, said governor having a maximum speed position selectable by the adjusting means, and means operative to unlock the accelerator means when the maximum speed is selected.

12. In a tractor having an operator's station, an engine and a throttle for controlling the fuel supply of the engine, and, in combination therewith, a governor dependent upon the rotation of the engine operative to maintain a variable predetermined speed under varying load conditions, speed selecting means for selecting the desired predetermined speed, accelerator means located adjacent the operator's station, means connecting the said accelerator means to the governor operative to manually regulate the speed of the engine independent of the governor, said means being inoperative during normal operation of the governor, and means actuated with the speed selecting means for rendering the manual means effective and for selecting a maximum speed obtainable by the engine during operation of the manual control.

13. In an automotive vehicle having an internal combustion engine and a throttle for controlling the same, and, in combination therewith, a governor device comprising centrifugal speed responsive means operatively connected to the engine for rotation therewith, control means connecting said means to the throttle for regulating the action of the centrifugal means to select a range of predetermined speeds and to select a predetermined maximum attainable speed, adjusting means operable to bring the engine into a predetermined slow idle speed when the control means is actuated to select the maximum attainable speed, means operable by said adjusting means to render the governor device inoperative at speeds between slow idle speed and said maximum attainable speed and manual means thereafter effective for operating at speeds between the slow idle speed and the maximum attainable speed independent of governor action.

14. A governor device for carburetor engines comprising a throttle control element connected to the throttle of the carburetor, centrifugal means operatively connected to rotate with the engine, a governing member connected to said centrifugal device, a second governor member pivotally connected to said first member and to the throttle control element, spring means for normally maintaining said elements in a fixed position with respect to each other, manually operable means for overcoming the spring means and moving said members relative to each other to open the throttle, and stop means positioned to lock the manual means out of operation during all speeds below a predetermined maximum speed setting of the governor.

15. In an engine governor having an oscillating actuating member adapted to be operated by rotating centrifugal weights, and, in combination therewith, a throttle actuating member, a control member pivoted on the actuating member and connected to the throttle control member, said control member having a stop portion engageable with a portion of the actuating member, spring means for maintaining the stop portion in engagement, manually operable means for overcoming said spring means and closing the throttle against the action of the actuating member, and means for locking the manually operable means out of operative position throughout a substantial range of operating speeds for which the device can be adjusted.

16. In a variable speed governor for internal combustion engines having a throttle valve, an oscillatory governor member, means consisting of centrifugal devices for urging the member in one angular direction and spring means for urging the member in the other direction, and, in combination therewith, a throttle control member pivotally connected to the governor member and connected to the throttle valve, spring means positioned to urge said control member against the governor member and in a direction to open the throttle valve, means operable to overcome said spring means and to return the throttle control member to idle speed position upon advancement of the governor member to a maximum speed position, and means manually operable thereafter to adjust the position of the throttle control member.

17. In a variable speed governor for internal combustion engines having a throttle valve, an oscillatory governor member, means consisting of centrifugal devices for urging the member in one angular direction and manually adjustable spring means for urging the member in the other direction, and, in combination therewith, a throttle control member connected to the throttle valve and to the governor member on an axis parallel to and spaced from the axis of oscillation of the governor member, spring means positioned to urge said control member against the governor member for movement therewith during the intermediate speed range and in a direction acting to open the throttle valve, means operable to overcome said spring pressure and to pivot the throttle control member relative to the governor member and to return it to idle speed position upon advancement of the governor member to a maximum speed position, and means manually operable thereafter to adjust the position of the throttle control member.

18. In a variable speed governor for internal combustion engines having a throttle valve, an oscillatory governor member, means consisting of centrifugal devices for urging the member in one angular direction and manually adjustable spring means for urging the member in the other direction, and in combination therewith, a throttle control member connected to the throttle valve and to the governor member on an axis parallel to and spaced from the axis of oscillation of the governor member, spring means positioned to urge said control member against the governor member for movement therewith during the intermediate speed range and in a direction acting to open the throttle valve, means operable to overcome said spring pressure and to pivot the throttle control member relative to the governor member and to return it to idle speed position upon advancement of the governor member to a maximum speed position, and accelerator means including a manually oscillatory member and an actuating member engageable by the oscillatory member and operative to engage and regulate the throttle control member.

19. In a variable speed governor for internal combustion engines having a throttle valve, an oscillatory governor member, means consisting of centrifugal devices for urging the member in one angular direction and spring means for urging the member in the other direction, and, in combination therewith, a throttle control member pivotally connected to the governor member and connected to the throttle valve, spring means positioned to urge said control member against the governor member and in a direction to open the throttle valve, relatively stronger spring means operable to overcome said spring pressure and to return the throttle control member to idle speed position upon advancement of the governor member to a maximum speed position, and means manually operable thereafter to overcome the stronger spring means to adjust the position of the throttle control member by action of the first named spring means.

20. In a variable speed governor for internal combustion engines having a throttle valve, an oscillatory governor member, means consisting of centrifugal devices for urging the member in one angular direction and spring means for urging the member in the other direction, and, in combination therewith, a throttle control member pivotally connected to the governor member and connected to the throttle valve, spring means positioned to urge said control member against the governor member and in a direction to open the throttle valve, an oscillatory accelerator shaft, a member pivoted on said shaft and engageable with the control member, resilient means connected to said member operable to overcome said spring means and to return the throttle control member to idle speed position upon advancement of the governor member to a maximum speed position, and means carried by the accelerator manually operable thereafter to adjust the position of the throttle control.

WALTER L. GORDEN.
PETER P. POLKO.